_United States Patent_ [19]

Rando

[11] Patent Number: 4,862,124
[45] Date of Patent: Aug. 29, 1989

[54] FIBER-OPTIC REED SWITCH
[75] Inventor: Joseph D. Rando, Dudley, Mass.
[73] Assignee: Imo Industries, Inc., Princeton, N.Y.
[21] Appl. No.: 146,196
[22] Filed: Jan. 20, 1988
[51] Int. Cl.[4] ............................................. H01H 1/66
[52] U.S. Cl. ................................. 335/151; 350/96.20; 250/229
[58] Field of Search ................................ 335/151–154; 340/365 P; 250/229, 231, 551; 350/96.20

[56] References Cited
U.S. PATENT DOCUMENTS 4,146,856  3/1979  Jaeschke ............................ 335/154
4,189,206  2/1980  Terai et al. ........................ 250/229

Primary Examiner—Clifford C. Shaw
Assistant Examiner—Lincoln Donovan
Attorney, Agent, or Firm—Hopgood, Calimafde, Kalil, Blaustein & Judlowe

[57] ABSTRACT

A magnetically responsive reed switch assembly having one or two cantilevered reed members arranged to close and open a gap responsive to respective levels of magnetic exposure, supports two optical fiber members in end-to-end closely spaced confrontation with the common axis alignment or misalignment of the fibers being a function of the relative closed or opened gap condition. A convenient method of fabrication involves mounting opposing cantilevered reed members on a substrate which is bent to bring the reed members closer together longitudinally. While so bent, a gap closing magnetic field is generated and a continuous length of optical fiber is bonded to the flat aligned surfaces of the reed assembly. The fiber is scored, broken at scoring, and stress and magnetic field is relieved, whereupon fiber ends shift laterally to produce open circuit condition.

20 Claims, 1 Drawing Sheet

FIBER-OPTIC REED SWITCH

BACKGROUND OF THE INVENTION

The invention pertains to magnetically sensitive switching means for optical-fiber circuitry.

Many schemes for fiber-optical switches have been proposed over the last few years. Most of these have been aimed at the telecommunications and data-communications markets, which means that they switch one fiber between two other fibers for the purpose of redirecting information flow. These devices tend to be expensive and require electrical energy to cause switching.

BRIEF STATEMENT OF THE INVENTION

It is an object of the invention to provide improved fiber-optic switching means which does not require electrical energy for its actuation.

It is a specific object to provide an on/off fiber-optic switching means of the character indicated.

It is also a specific object to meet the above object with fiber-optic switching means which is actuated by local presence of a magnetic field of predetermined strength and orientation.

Another specific object is to employ magnetic-reed elements for the switching of optical fibers and thus, among other things, allow for a continuous monitoring of the line integrity of fiber-optic systems, all in replacement of electrical systems which currently use standard reed switches.

It is a general object to meet the above objects with structures and methods of manufacture which are basically simple, accurate an inexpensive.

The invention achieves the foregoing object by providing for the magnetically switching alignment or misalignment of the confronting adjacent ends of two optical fibers, as distinguished from the current practice of switching one fiber between positions of alignment with one or the other of two further fibers. Thus, switches of the invention can be used to determine the absence or presence of a magnetic field. A permanent magnet moved into a predetermined positional relationship can actuate the switch, but no electrical energy is required unless the electrical energy is to be used to generate the actuating magnetic field, as in an electromagnet. By so arranging that the switched states are between (a) optical-fiber alignment and (b) only partial misalignment, it is possible always to pass at least a small amount of light and thus to provide for monitoring line integrity of a fiber-optic circuit.

In the currently preferred method of manufacture of a fiber-optic reed switch of the invention, no aligning of optical fibers is required, since assembly proceeds using a single optical fiber which is severed into two correctly aligned fibers only after the step of bonding the single fiber to each of two paramagnetic reed elements. Consequently, no fiber-alignment features are needed either on the reeds or on substrate structure for mounting the reeds.

BRIEF DESCRIPTION OF THE DRAWINGS

The invention will be described for various illustrative embodiments, in conjunction with the accompanying drawings, in which:

FIGS. 4, 5, 6 and 7 are views similar to FIG. 3 to show modifications; and

DETAILED DESCRIPTION OF THE PRESENTLY PREFERRED EMBODIMENTS

Figure 1:
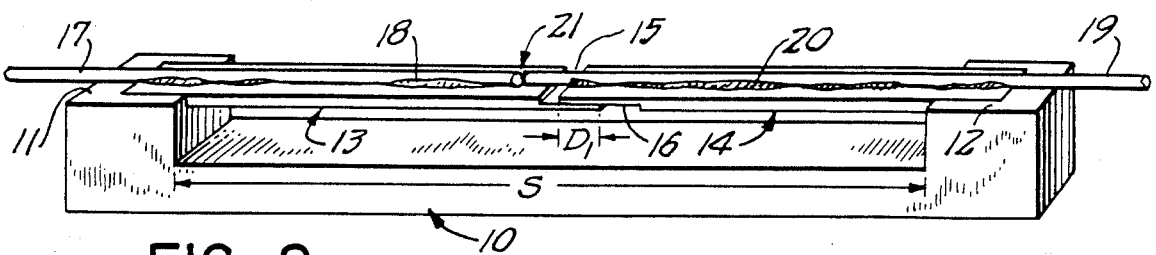
FIGS. 1 and 2 are like simplified generally isometric views of a fiber optic switch of the invention, respectively showing closed and open conditions of the switch.
Figure 2:
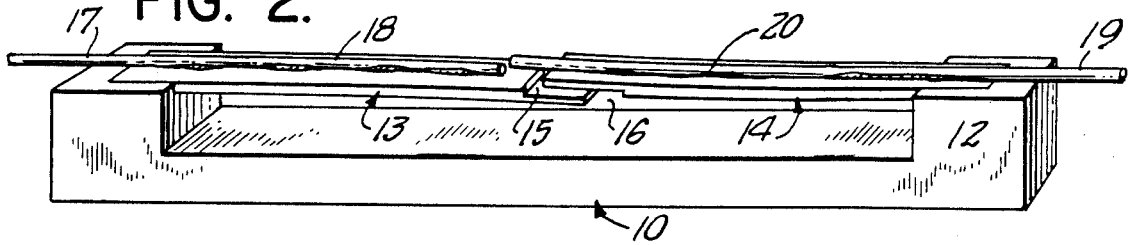

In FIGS. 1 and 2, a fiber-optic switch of the invention is shown to comprise a magnetically transparent base or substrate 10 having two upstanding pedestals 11–12 which are longitudinally spaced by a distance or span S. A first elongate paramagnetic reed elements 13 is mounted as a cantilever, being anchored at one end to the pedestal 11, with its other end projecting toward pedestal 12; and a second elongate paramagnetic reed element 14 is similarly mounted to pedestal 12, being cantilevered in the direction of pedestal 11. The respective cantilevered ends of elements 13–14 have longitudinal overlap, to the extent $D_1$, at a central lcoation in the span S. Reed elements 13–14 are of like rectangular section, and the overlapping ends are stepped to half thickness, the step 15 of reed 13 facing up and the step 16 of reed 14 facing down, so that for the closed condition shown in FIG. 1, the upper surfaces of both reed elements are in the same plane. A first length 17 of optical fiber is bonded by adhesive 18 to the upper surface of reed 13, and a second length 19 of optical fiber is similarly bonded by adhesive 20 to the upper surface of reed 14. As shown, length 17 terminates short of the upwardly facing step 15, and length 19 projects beyond the end of the downwardly facing step 16 and into short stabilizing overlap with the full thickness of reed elements 13, the adjacent ends of fiber lengths 17–18 being in closely spaced confronting registry when in the switch-closed relation of FIG. 1.

Figure 2A:
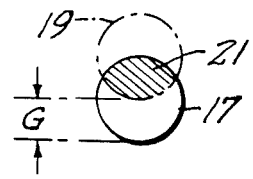
FIG. 2A is a diagram to greatly enlarged scale, to show the reduction in optical transmission for the open-switch condition of FIG. 2.

The switch-open relation of FIG. 2 is characterized by a transverse gap or offset G at the region of overlap of the ends of reeds 13–14, between the overlapping faces of the steps 15–16; in this condition, the adjacent fiber ends are no longer is register but have been misaligned to the extent G, shown in FIG. 2A, so that light transmission from one to the other of fiber lengths 17–19 is substantially reduced, as approximately to the shaded area 21 shown in FIG. 2A.

When in the presence of a magnetic field wherein the elongation axes of the reed elements have a material component of alignment with lines of force in the magnetic field, the respective confronting surfaces of the stepped and overlapped ends of the reed elements assure a North and South pole-face relation, and if the magnetic field is of sufficient strength, these poles will attract to close the gap G, against the resistive-force of compliantly bending elements 13–14 into gap-closing contact with each other. Thus, the gap closed relation of FIG. 1 reflects the suitably oriented environmental presence of a sufficient strong magnetic field, and the gap-open relation of FIG. 2 reflects the insufficient strength or unsuitable alignment of any environmental magnetic field. Of course, in the switch-closed FIG. 1 relation, both fibers 17 and 19 are aligned for maximum light transmission from a source input (not shown) for one fiber, to a photocell (not shown) for response to light output of the end of the other fiber; and in the gap-open condition of FIG. 2, there will still be light transmission from source to photocell, but at much-reduced intensity.

Figure 3:
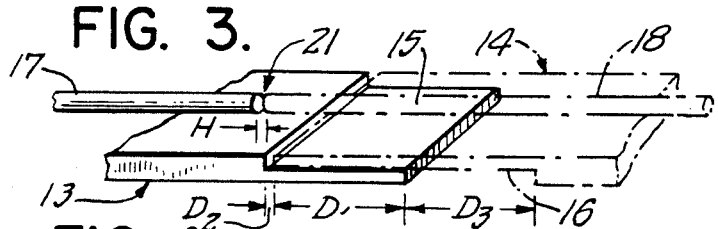

The diagram of FIG. 3 is useful in identifying certain dimensional and other relationships for what has been described. Generally, the rectangular section of the reed elements should involve the width-to-thickness (W:T) ratio of at least 2:1, a 3:1 to 5:1 ratio being preferred. The reed-overlap region $D_1$ is in the range of 1 to 5 percent of the longitudinal span S of cantilevered-reed extent. More specifically, for a presently preferred situation (wherein each of the reed elements is a flux-conducting nickel-iron alloy known as "CO-NETIC B", available from Magnetic Shield Corporation, Bensenville, Illinois, (b) wherein each of the reed elements is cantilevered to the extent of 1.50 inches to cover a span S of 1.465 inches and are of 0.025-inch thickness and 0.095-inch width, and (c) wherein the glass fiber is a standard data-communication transmission-line product of American Telephone and Telegraph Company, having a 62.5-micron core diameter with cladding to 125-micron diameter; the transverse gap G is 0.001 to 0.0015 inch; the longitudinal gap H between adjacent reeds of glass fibers 17–19 is 0.0005 inch; the overlap $D_1$ is 0.035 inch, the longitudinal clearance $D_2$ of the end of reed elements 14 to the full-thickness shoulder of reed element 13 is 0.010 inch; and the longitudinal clearance $D_3$ of the end of reed element 13 to the full-thickness shoulder of reed element 14 is 0.125-inch.

The described structure is prepared by first securely mounting the reed elements 13–14 to their respective pedestals, in the environmental circumstance of no actuating magnetic field, such that the gap G is precisely defined. Thereafter, and in the case of base 10 having a modicum of stiffly compliant yieldability, bending force is applied downward to the longitudinal center of base 10 and upward at each of the pedestals 11–12, thus bowing the base 10 and slightly tipping the pedestals toward each other, increasing the longitudinal overlap of the reed ends, by the incremental distance H. The reeds are then exposed to a magnetic field of sufficient strength to bring the lapped reed ends into gap-closing relation, at which point the upper surfaces of both reed elements are in essentially a common plane. A single elongate optical fiber is then laid upon the flat upper surfaces of the reeds, the adhesive (18, 20) is then applied and allowed to set. The adhesive is suitably UNI-SET UV-311, a fast-curing low-viscosity adhesive with wetting properties, curing being accelerated in the presence of ultraviolet light; UV-311 is a product of Emerson & Cuming, a W. R. Grace company. When the adhesive has cured, a scoring is applied to the fiber to establish a fracture location 21; fracture occurs at 21 when the magnetic field is removed and the reeds are forced to separate by applying an upward force on reed 14. Bending stress on base 10 is then removed, and base 10 restores itself to unstressed condition. The now-separate fibers 13–14 have closely spaced ends, at longitudinal separation H, and these ends will align in the presence of a sufficient magnetic field. What has been described is a completed and useful switching device, but for commercial purposes it is desirable to additionally provide for external optical-circuit connections, as by using AT&T standard connectors (ST-Series Multi-mode Fiber Optic Connectors) and by enclosing or by integrating the assembly of FIG. 1 into a light-tight enclosure (not shown).

Figure 4:
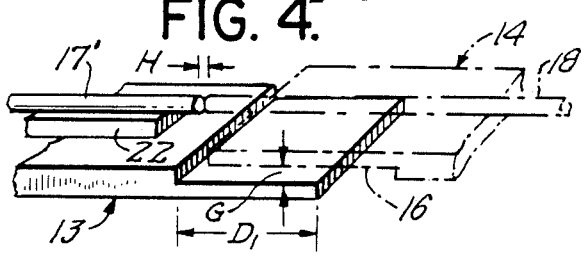
FIG. 4 is a fragmentary view of coacting portions of the switch of FIG. 1, to permit discussion of dimensional relationships.

The diagram of FIG. 4 illustrates use of the reed and base structure of FIGS. 1 to 3 in application of a fiber-optic switch of normally closed variety. Thus, in FIG. 4, for the depicted unactuated condition where gap G exists at the region of reed-end overlap, a precision shim 22 is bonded to the upper surface of reed elements 13, so that fibers 17' and 18 can have registering closely adjacent ends when gap G exists. Upon actuation in the presence of a sufficient magnetic field, the gap G reduces to zero and a substantially reduced optical coupling results, as depicted in FIG. 2A.

Figure 5:
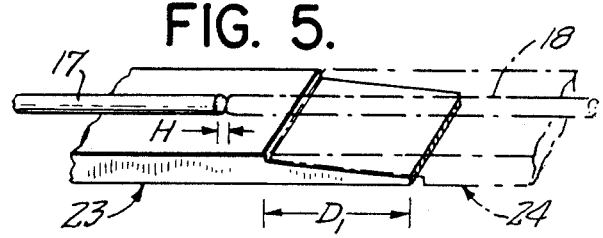

The diagram of FIG. 5 illustrates a modification involving complimentary wedge or sloping notch formation of the magnetic-reed ends 23–24 at their region $D_1$ of overlap. Optical fibers 17–18 are mounted to reeds 23–24 in the manner described for FIG. 1 or FIG. 4, depending upon whether the switch is to be of normally open or normally closed variety.

Figure 6:
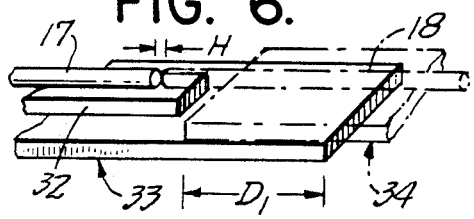

In the arrangement of FIG. 6, the lapped ends of reed elements 23–34 are of full reed thickness, i.e., not notched. For the depicted gap-closed (actuated) condition, a shim 32 bonded to reed element 33 positions its fiber 17 for aligned registration with the adjacent end of fiber 18. When gap G is allowed to develop, i.e. in absence of an actuating magnetic field, a light-tranmitting relation as depicted in FIG. 2A is established.

Figure 7:
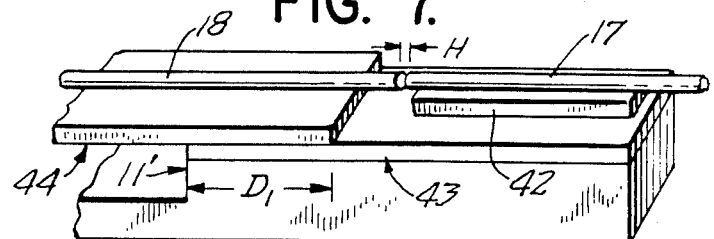

In the arrangement of FIG. 7, the magnetic equivalent 43 of one of the reed elements has no cantilever suspension; it has no free end and is fixedly mounted to one (11') of the pedestals of base 10. The other reed element 44 is the only cantilevered member and will be understood to be mounted to the other pedestal 12 (not shown in FIG. 7) and to extend for the full span S, plus the region of overlap $D_1$ with the fixed paramagnetic element 43. For the actuated position shown for the normally open switch of FIG. 7, a shim 42 bonded to element 43 positions fiber 17 in aligned registration with the fiber 18 that is mounted to reed element 44. When in its normally open position, involving a gap G between elements 43-44 at region $D_1$, the reduced light-transmitting capability is again as illustrated in FIG. 2A.

Figure 8:
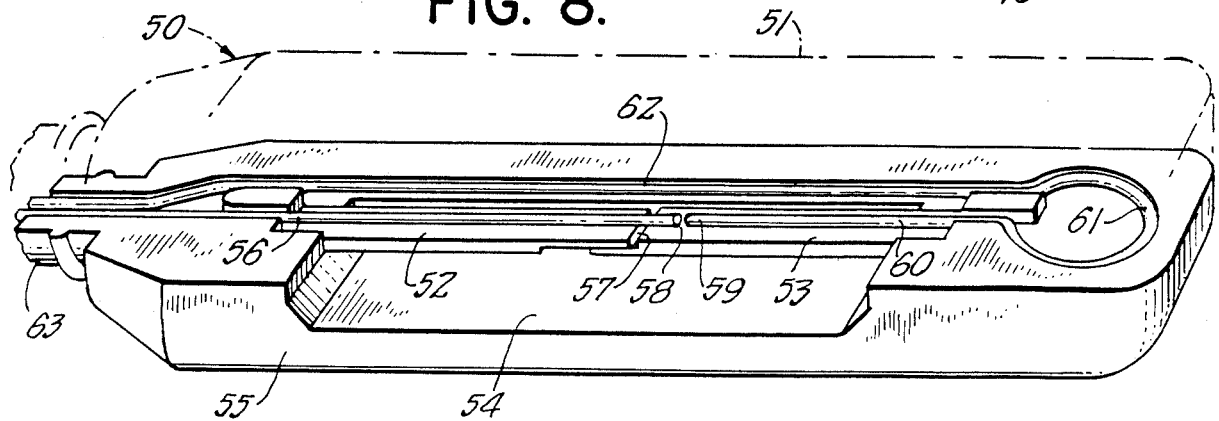
FIG. 8 is an isometric view in greater detail to show a presently preferred embodiment of a complete article of manufacture.

Referring now to FIG. 8, there is shown a fully encapsulated embodiment 50, the upper portion of the case 51 being shown in phantom lines for revealing the inner construction wherein reed members 52 and 53, constructed as described with reference to FIG. 1, are mounted cantilever fashion over a longitudinal recess 54 in the bottom half 55 of the case 50. An optical fiber 56 enters the case 50 and is bonded to reed 52, bridging the half thickness longitudinal inter-reed separation 57 and terminating at small gap 58 confronting the opposing end 59 of the fiber continuation 60, bonded to reed 53, then looping around in channel 61 to return via longitudinal channel 62 to the terminal end 63 of the case 50. Optical connections can then be made to the optical fibers at the terminal end 63 in any known manner. It is to be understood that FIG. 8 shows the switch in circuit closed condition, the circuit being "opened" by inducing a transverse separation or gap between the overlapped ends of reeds 52 and 53 to cause misalignment of the optical fibers as illustrated in FIG. 2A. The open circuit can be brought about by decreasing the magnetic field strength, it being assumed that the FIG. 8 condition is induced by the presence of a magnetic field.

What is claimed is:

1. Optical-fiber switching means, comprising a base providing two longitudinally spaced upstanding pedestals and a separate elongate reed element having cantilevered mounting to each of said pedestals, said element having free ends which longitudinally overlap at a location between said pedestals, said elements being of paramagnetic material and establishing a transverse gap relationship between their overlapped ends in the presence of a first environmental magnetic condition in which said reeds do not conduct sufficient magnetic flux to close said gap, and said elements coacting for actuation into a second relationship of gap closure in the presence of a second environmental magnetic condition in which said reeds define a gap-free path of magnetic-flux conduction, and optical-fiber lengths having adjacent ends carried by the respective reed elements, said optical-fiber ends being in mutually aligned closely spaced confronting relation when said reed ends are in one of said relationships and being in transversely offset misaligned but partially confronting relation when said reed ends are in the other of said relationships.

2. Optical-fiber switching means according to claim 1, wherein said optical-fiber ends are aligned when said reed ends are in the gap-closed relationship.

3. Optical-fiber switching means according to claim 1, wherein said optical-fiber ends are aligned when said reed ends are in their transverse-gap relationship.

4. Optical-fiber switching means according to claim 1, wherein said optical-fiber ends are of identical clad-core configuration and wherein said gap is approximately equal to the radius of the core.

5. Optical-fiber switching means according to claim 1, wherein said optical-fiber ends are of identical clad-core configuration and wherein said gap is less than the radius of the core.

6. Optical-fiber switching means according to claim 1, wherein said optical-fiber ends are of identical clad-core configuration and wherein said gap is greater than the radius of the core.

7. Optical-fiber switching means according to claim 1, wherein said reed elements are of rectangular section and are mounted for longitudinal overlap of their respective width dimensions.

8. Optical-fiber switching means according to claim 1, wherein said reed elements are of rectangular section and are noted for substantially a one-half thickness reduction at their region of overlap, thereby defining tongues of half-section thickness at the region of overlap.

9. Optical-fiber switching means according to claim 8, wherein, at overlap, the notches of the ends of said reed elements are mutually adjacent, whereby in the gap-closed relationship the sections of said reeds are in longitudinal alignment.

10. Optical-fiber switching means, comprising a base providing two longitudinally spaced upstanding pedestals and means establishing a magnetic flux-conducting path between said pedestals, said means comprising two elements of paramagnetic material each of which elements is mounted to one of said pedestals, at least one of said elements being elongate and stiffly compliant and mounted with a cantilevered end which longitudinally laps the other of said elements, said elements establishing a transverse gap relationship between their overlapped ends in the presence of a first environmental magnetic condition in which said elements do not conduct sufficient flux to close said gap, and said elements coacting for actuation into a second relationship of gap closure in the presence of a second environmental magnetic condition in which said elements define a gap-free path of magnetic-flux conduction, and optical-fiber lengths having adjacent ends carried by the respective elements, said optical-fiber ends being in mutually aligned closely spaced confronting relation when said element ends are in one of said relationships and being in transversely offset misaligned but partially confronting relation when said elements are in the other of said relationships.

11. Optical-fiber switching means according to claim 10, in which the other of said elements is mounted to its pedestal at at least part of the region of overlap.

12. Optical-fiber switching means according to claim 10, in which the other of said elements is elongate and stiffly compliant and mounted to its pedestal such that a cantilevered end thereof extends to the region of overlap.

13. Optical-fiber switching means according to claim 1, in which said reed elements are of nickel-iron alloy.

14. Optical-fiber switching means according to claim 1, in which the extent of longitudinal overlap of said ends is in the range of 1 to 5 percent of the longitudinal span between pedestal support of said reed elements.

15. Optical-fiber switching means according to claim 7, in which the width:thickness ratio of said reed elements is at least 2:1.

16. Optical-fiber switching means according to claim 7, in which the width:thickness ratio of said reed elements is approximately 4:1.

17. An an article of manufacture, the switching means of claim 1 or claim 10, further including a light-tight enclosure of magnetically transparent material in clearance relation with said reed elements, and externally exposed connector means for the respective other ends of said optical-fiber lengths.

18. Optical-fiber switching means according to claim 1, in which the number of optical-fiber lengths carried by each magnetic reed is one.

19. Optical-fiber switching means according to claim 1, in which a corresponding plurality of optical-fiber lengths is carried by each magnetic reed.

20. Optical-fiber switching means according to claim 1, in which the thermal coefficient of expansion of said reed elements on the one hand and the thermal coefficient of expansion of said base on the other hand are substantially equal, whereby magnetic reluctance at said gap is substantially independent of changes in ambient temperature, and the longitudinal space between said reed ends is substantially independent of changes in ambient temperature.

* * * * *